Dec. 19, 1933.　　　　G. A. PEACOCK　　　　1,940,012
VEHICLE WHEEL
Original Filed May 1, 1929
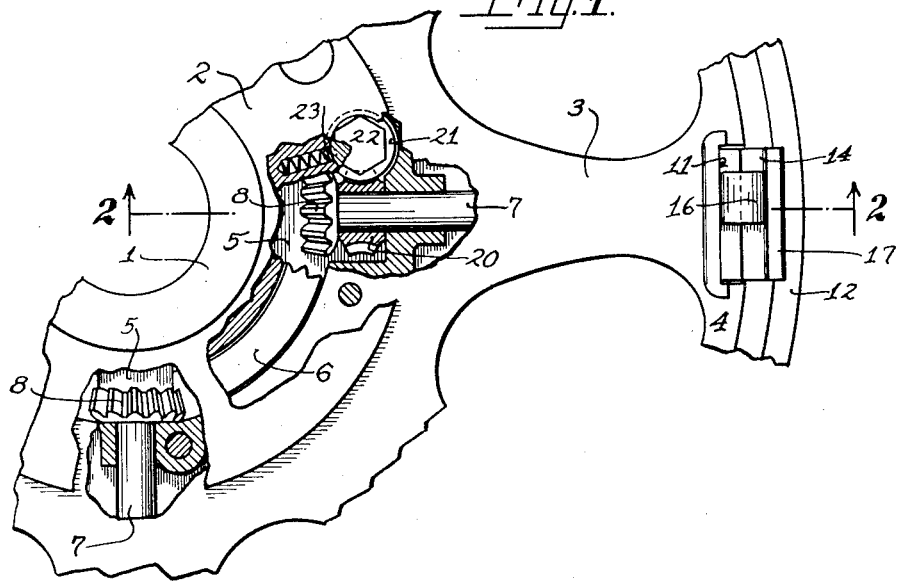
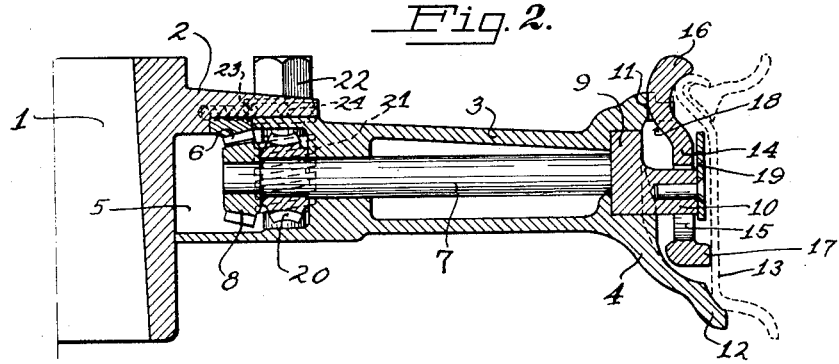
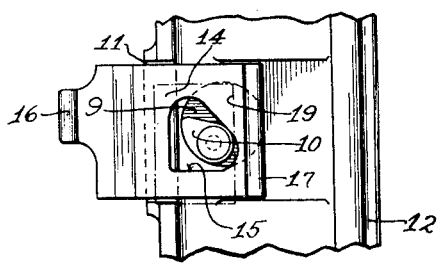
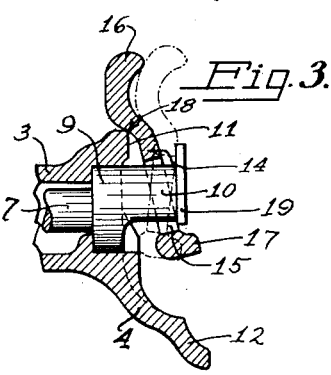
INVENTOR.
George A. Peacock.
BY Harry A. Totten
ATTORNEY.

Patented Dec. 19, 1933

1,940,012

UNITED STATES PATENT OFFICE 1,940,012

VEHICLE WHEEL

George A. Peacock, San Jose, Calif., assignor to Peacock Motor Wheel Corporation, Sheboygan, Wis., a corporation of Delaware Application May 1, 1929, Serial No. 359,554
Renewed October 24, 1933

6 Claims. (Cl. 301—28)

This invention relates to improvements in vehicle wheels, and more particularly to a structure for detachably securing a rim to a wheel felloe, or circumferentially of the wheel body.

Among its objects the invention is to provide a structure designed particularly for use in connection with metallic wheels, and while the operating means for holding the rim in operative position on the felloe is illustrated as being concealed within the hollow spokes, such construction may be varied and the mechanism exposed. A further object is to provide a structure wherein any standard form of rim is adapted to be detachably mounted on a wheel felloe and held thereon at a plurality of points. Another object is to provide means for simultaneously reciprocating rim holding or clamping means, and for locking the same in their operative position. A further object is to provide a novel form of clamp and operating means designed for positive operation in inward or clamping and outward or releasing movement. A further and important object is to provide a structure which is capable of being manufactured cheaply, one which is simple and certain in its operation, and one by the use of which the mounting or demounting of a rim on a felloe will be accomplished in a short time and with little effort.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

In the drawing:—

Fig. 1 is a view in broken plan of a part of a vehicle wheel illustrating my invention in connection therewith.

Fig. 2 is a sectional view on line 2—2 of Fig. 1.

Fig. 3 is a view of one of the clamp plates in its released position.

Fig. 4 is a view in plan of the disclosure in Fig. 3.

In the drawing, 1 indicates a vehicle wheel body having a hub 2, spokes 3 and a felloe 4. The hub is provided with an annular chamber 5, in which is mounted to rotate a ring gear 6 formed with groups of teeth about its area. Within each spoke is mounted for axial rotation a shaft 7, each shaft carrying a pinion 8 intermeshing with the ring gear 6. The respective shafts at their outer ends are provided with enlarged heads 9 seated in the recess at the end of the shaft and preferably axially aligned therewith and communicating with the surface of the felloe. Each head 9 has extended therefrom a cam projection 10 eccentrically disposed relative to the axis of rotation of its associated head and preferably ellipsoidal so as to provide a peak and butt, as shown in Fig. 4. The cam projection extends a slight distance beyond the surface of the felloe and revolves in a plane normal or perpendicular to the radius of the wheel. The forward edge of the felloe is provided with an annular relatively flat surface 11 and the rear edge of the felloe extends upwardly radially to the wheel body a sufficient distance to afford a stop 12 for the tire mounting rim 13 of any standard construction.

Engaged by each cam projection 10 is a clamp plate 14, each plate having a triangular opening or recess 15 therein to slidably receive the cam and each plate being formed at its forward edge with a tire rim engaging hook 16 and at its rear edge with an upstanding rim engaging lip 17. Each plate is provided with an inclined wall 18 for riding on the felloe surface 11. This riding action imparts an upward or radial movement to the hooked end of the clamp plate, as the same is drawn inwardly transversely of the wheel felloe into rim locking position. The opening or recess 15 preferably has a rear wall angularly disposed relative to the forward wall, that is, the rearward wall forms the hypothenuse of the triangular opening 15, and it will be obvious that upon rotation of the shaft, the race of a portion of the cam will be from one side, say the left side, to the other side or right side of a line perpendicular to the axis of rotation of the shaft and laterally of the wheel body, which line may be termed the dead center of cam rotation.

To secure the respective clamp plates in operative position on the cam projections, a suitable retaining plate 19 is attached at the end of each cam projection 10, and is of an area greater than that of the opening 15. One of the shafts 7 is provided with a worm gear 20, with which meshes a worm 21 on shaft 22 extending into the hub chamber and mounted therein for axial rotation. The shaft 22 has a polygonal end for engagement by a wrench, and to hold the same in its rotated position a suitable locking pawl 23, spring held in a recess, is adapted for reception within depressions 24 disposed circumferentially of the shaft 22.

With the parts assembled as in the drawing, it will be observed that when the shafts are rotated to position the peak of the cam surfaces 10 forwardly, the forward wall of the triangle is contacted and the clamp plates are moved to released position; and when the cams are rotated to position the cam surfaces rearwardly, the clamp plates are held in rim engaging position. This rotation is accomplished by manipulating the shaft 22, which rotates one of the members 7, and it in turn imparts rotation to the other shafts through the ring gear 6.

It will be noted from Fig. 4, that the axis of rotation of the shaft 7 is substantially central of the rear wall of opening or recess 15, so that as the shaft 7 is rotated, the eccentrically mounted cam 10 moves to the opposite side of said axis of rotation, and being engaged by the more forward portion of said rear wall, any vibration of the plate locks the cam against reverse rotation, since the pressure against the cam would then be forward, as distinguished from a reverse movement which would loosen the cam and thereby loosen the lock plate.

I claim:—

1. In a device to releasably lock a rim on a wheel body, a rotatable shaft mounted radial to the wheel hub, said shaft having a cam projection at its radial outer end, the cam being adapted for rotation in a plane normal to the radius of the wheel, a lock plate adapted for sliding laterally of the periphery of the wheel body and having an opening therein adapted to receive said cam, said cam and said opening being relatively so formed that upon rotation of the shaft in one direction the plate is moved laterally of the wheel in one direction and upon rotation of the shaft in the other direction the plate is moved in an opposite direction laterally of the wheel.

2. In a device to releasably lock a rim on a wheel body, a rotatable shaft mounted radial to the wheel hub, said shaft having a cam projection at its radial outer end, the cam being adapted for rotation in a plane normal to the radius of the wheel, a lock plate adapted for sliding laterally of the periphery of the wheel body and having an opening therein adapted to receive said cam, said opening having a rearward wall angularly disposed relative to the direction of lateral movement of the plate and said cam having a wall adapted for slidable contact with said rearward disposed wall.

3. In a device to releasably lock a rim on a wheel body, a rotatable shaft mounted radial to the wheel hub, said shaft having a cam projection eccentric to the axis of rotation of the shaft, a lock plate adapted for sliding laterally of the periphery of the wheel body and having an opening therein adapted to receive said cam, said opening having a rearward wall angularly disposed relative to the direction of lateral movement of the plate and a forward wall disposed at an acute angle to the rearward wall, and said cam having a peak and an arcuately formed butt, said peak being adapted to contact with said forward wall upon rotation of the shaft in one direction, and said arcuate butt being adapted for slidable frictional contact with said rearward wall upon rotation of the shaft in the other direction.

4. In a device to releasably lock a rim on a wheel body, a rotatable shaft mounted radial to the wheel hub, said shaft having a cam projection at its radial outer end, the cam being adapted for rotation in a plane normal to the radius of the wheel, a lock plate adapted for sliding laterally of the periphery of the wheel body and having an opening therein adapted to receive said cam, said opening having a rearward wall angularly disposed relative to the direction of movement of said plate transverse the wheel periphery.

5. In a device to releasably lock a rim on a wheel body, a rotatable shaft mounted radial to the wheel hub, said shaft having a cam projection at its radial outer end adapted to rotate therewith, the cam being adapted for rotation in a plane normal to the radius of the wheel, a lock plate adapted for sliding laterally of the periphery of the wheel body and having an opening therein adapted to receive said cam, said opening having a forward wall and a rearward wall relatively angularly disposed, and said cam, upon rotation of the shaft in one direction, being adapted to bear against the rearward wall and thereby move the plate in one direction transversely of the wheel, and said cam, upon rotation of the shaft in the other direction, being adapted to bear against the forward wall and thereby move the plate in an opposite direction transversely of the wheel.

6. In a device to releasably lock a rim on a wheel body, a shaft mounted radial to the wheel hub and adapted for rotation on its longitudinal axis, a cam having a portion, the face of which, upon rotation of the shaft, is adapted for movement from one side to the other side of a dead center line taken perpendicular to the axis of rotation of the shaft and laterally of the wheel body, a lock plate adapted for sliding laterally of the periphery of the wheel body and having sliding engagement against the said cam upon rotation of the shaft, the said plate and said cam being adapted for relative loose engagement when the cam lies on one side of said dead center line and adapted for relative tight engagement when the cam lies on the other side of said dead center line, said movement of the cam being responsive to the rotation of said shaft.

GEORGE A. PEACOCK.